Dec. 24, 1940.  J. A. EREKSON  2,225,984
SEDIMENT TESTER
Filed March 20, 1939   3 Sheets-Sheet 1

Inventor
John Arion Erekson
By his Attorneys
Merchant & Merchant

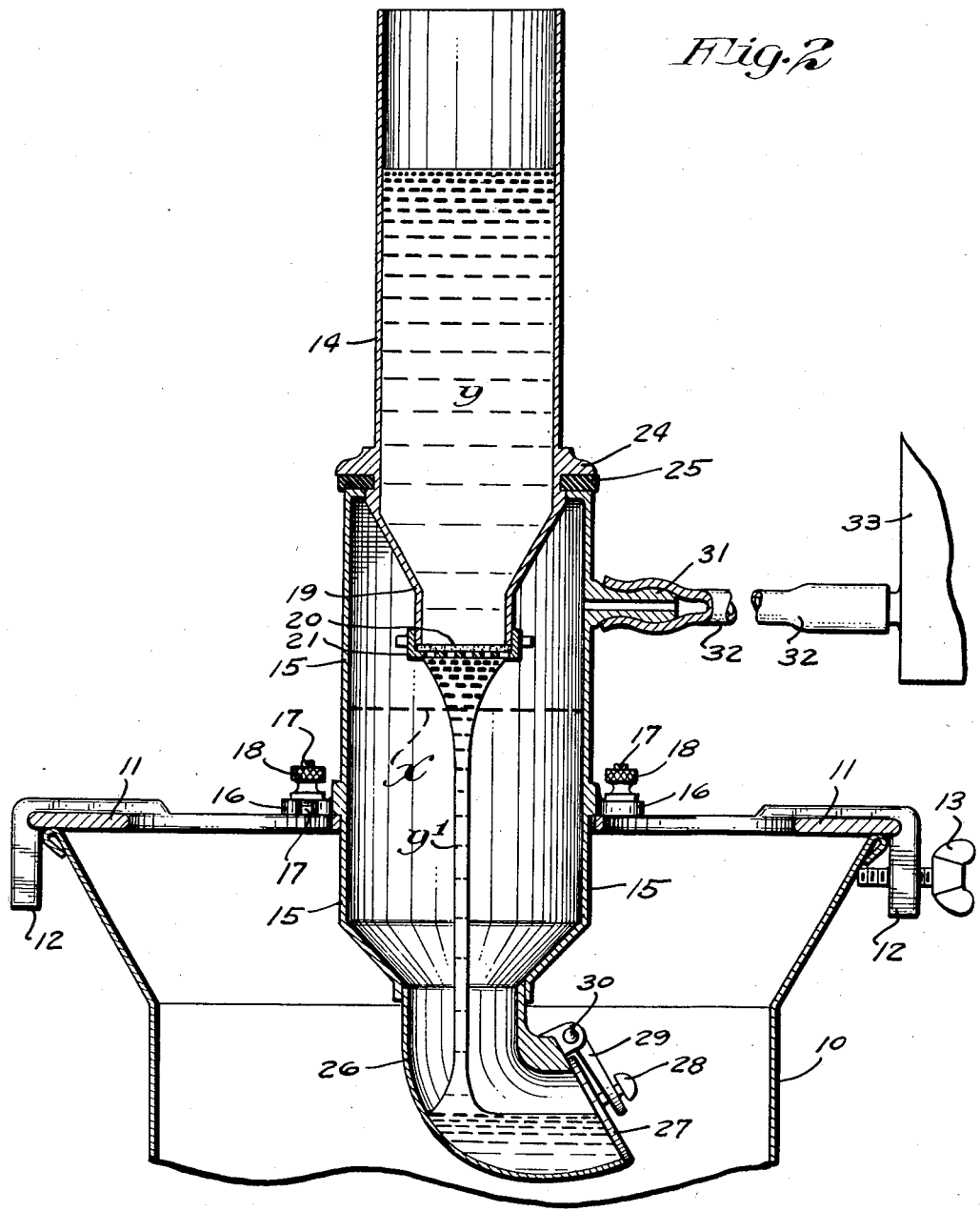

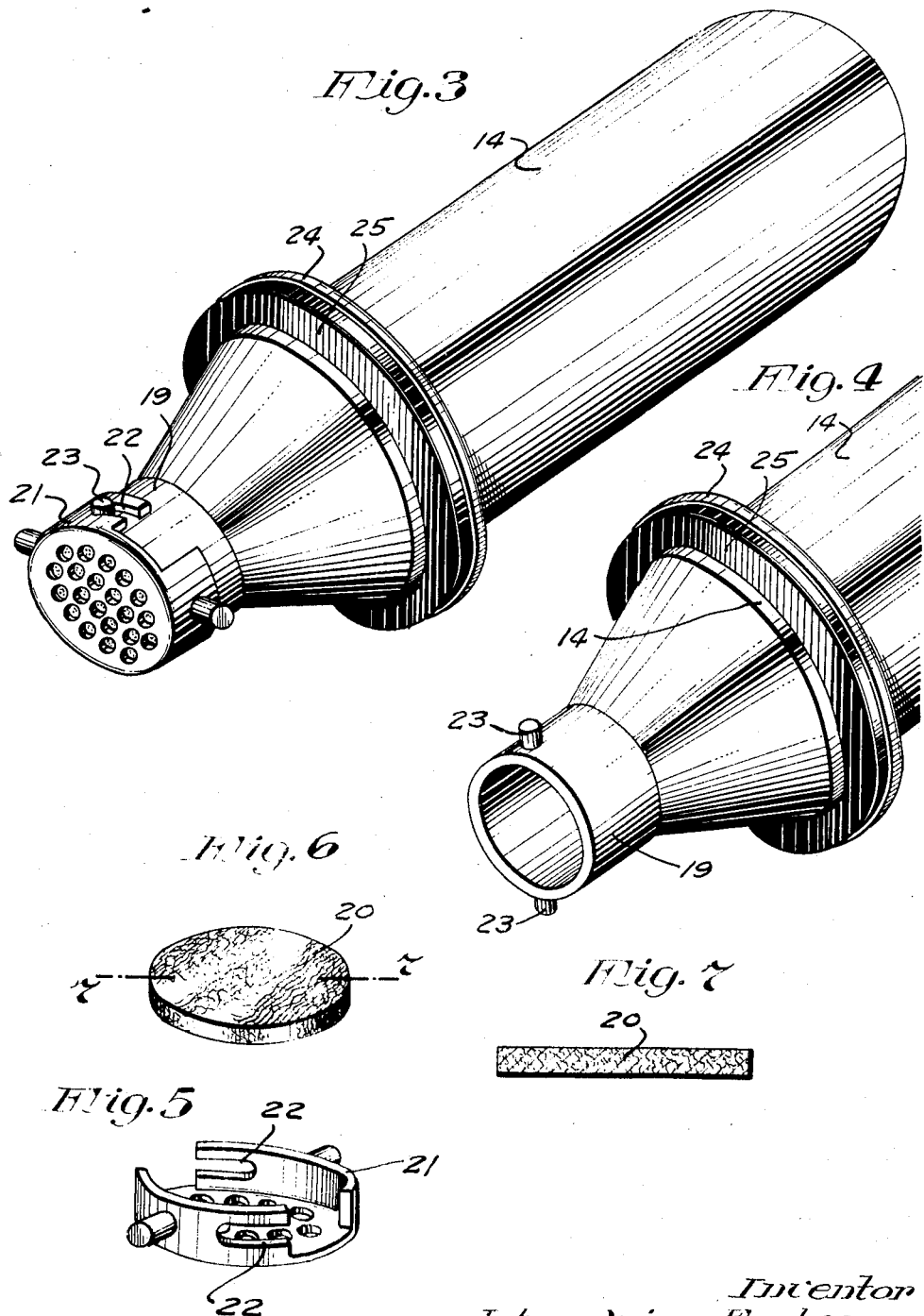

Patented Dec. 24, 1940

2,225,984

UNITED STATES PATENT OFFICE 2,225,984

SEDIMENT TESTER

John Arion Erekson, St. Paul, Minn.

Application March 20, 1939, Serial No. 262,929

8 Claims. (Cl. 73—51)

My invention provides an extremely simple and highly efficient sediment tester, adapted for collecting for test purposes, the sediment in various liquids. This invention, however, was especially designed for collecting the sediment from milk, for test purposes; and in the accompanying drawings I have illustrated a commercial form of the apparatus especially designed for that specific purpose, but which is capable of a very large range of analagous use. However, in describing this commercial form of the apparatus, it will be treated as an apparatus used for testing the sediment in milk.

The laws of most states require that creameries and other concerns handling milk in large quantities, make tests of all of the various batches of milk that come in for distribution. It is highly desirable that these tests be made very quickly and accurately. The milk, under the action of gravity alone, passes but very slowly through the filtering medium of the apparatus. It is known that the flow of the milk or other liquid through the filtering medium may be accelerated by partial vacuum acting as suction.

My invention is directed to an apparatus that will utilize partial vacuum, in a small chamber of the apparatus, to accelerate the flow of the milk through the filter, and that will then quickly discharge the milk from the apparatus and into a suitable receptacle, such as an ordinary milk can, for example. This rapid action is accomplished by the use of a supply cup having a filter in its bottom, combined with a vacuum cup arranged to receive the milk from the filter and provided with a depending discharge passage normally closed by a valve that will be held closed under the action of partial vacuum, but will open for the discharge of the strained milk when the vacuum cup is relieved from the partial vacuum or reduced to or approximately to atmospheric pressure.

In the arrangement above outlined the vacuum cup is connected to a source of suction or partial vacuum. As long as there is milk in the supply cup above the filter, the vacuum cup will be subject to partial vacuum or suction, and when the milk from the milk cup has passed through the filter to a point in the vacuum cup below the filter, air will rush into the vacuum cup and restore the pressure in the vacuum cup to or approximately to atmospheric pressure, with the result above indicated, to wit; that the discharge valve in the bottom of the vacuum cup will be opened by the pressure of the milk, and the latter will flow into the can or other receptacle provided therefor.

In the accompanying drawings which illustrate the apparatus above outlined, like characters indicate like parts throughout the several views.

Referring to the drawings:

Fig. 2 is a vertical axial section taken through the apparatus and the milk can and indicating means for producing partial vacuum or suction in the vacuum cup;

Fig. 3 is a perspective showing the milk can or receptacle removed from the vacuum cup but with its filter-holding cap applied thereto;

Fig. 4 is a view corresponding to Fig. 3 but with the filter-holding cap removed and some parts of the cup being broken away;

Fig. 5 is a perspective showing the filter-holding cap removed;

Fig. 6 is a perspective showing the filtering medium in the form of a customary filtering disc; and Fig. 7 is a section taken on the line 7—7 of Fig. 6.

Figure 1:
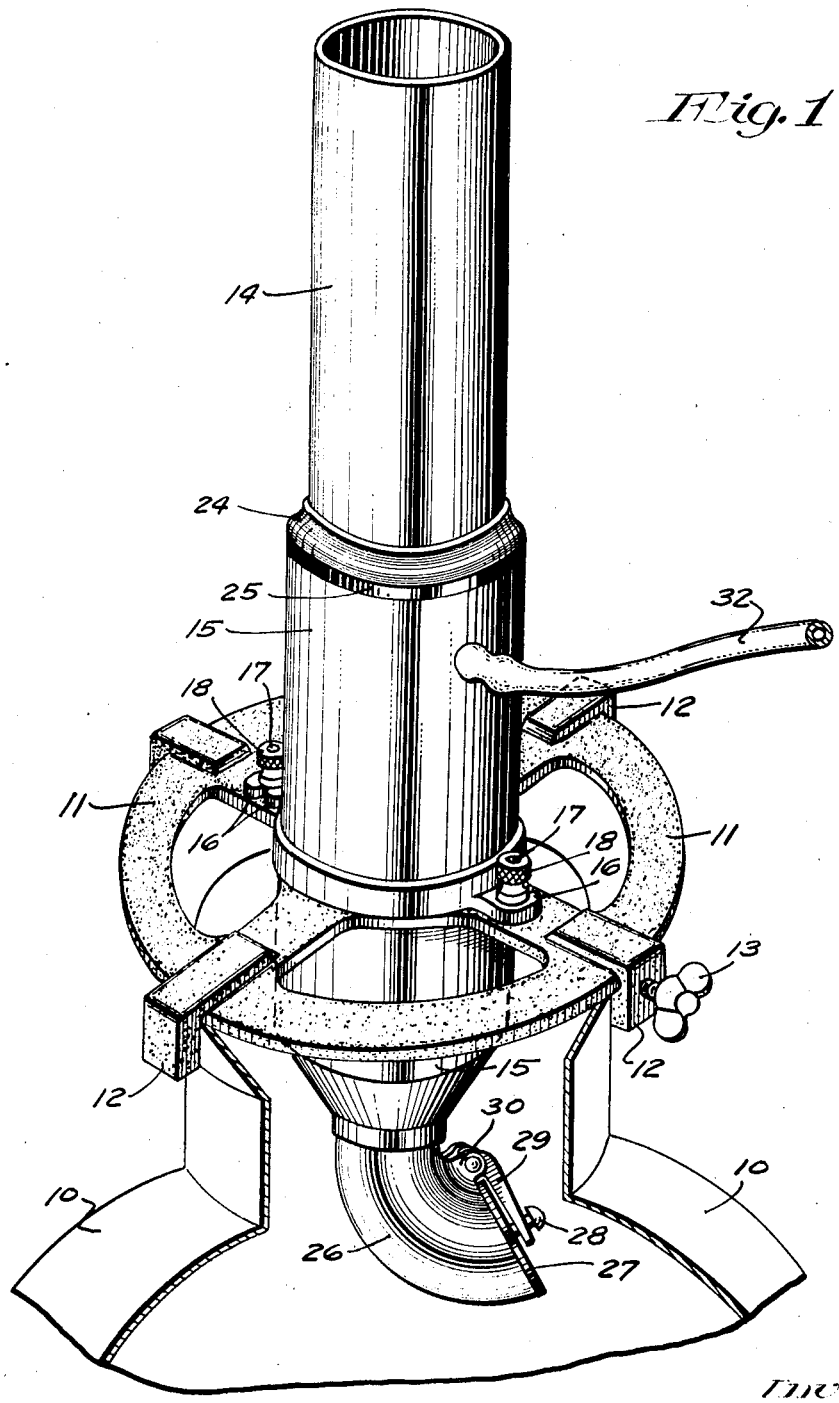
Fig. 1 is a perspective showing the apparatus applied on an ordinary milk can, a part of the latter being cut away.

In Figs. 1 and 2 the ordinary milk can is indicated by numeral 10. For the particular use as a milk sediment tester the apparatus is arranged to be supported on a skeletonized annular base plate 11, adapted to be placed on the top of the milk can and provided with depending retaining lugs 12, one of which is shown as provided with a set screw 13 for engagement with the neck of the milk can.

The testing apparatus involves a supply cup 14 and a vacuum cup 15, both of which preferably have cylindrical bodies. The vacuum cup 15 is freely telescoped through an axial opening of the base plate 11 and, as shown, is provided with hook-like or notched lugs 16 that engage upstanding studs 17 of the base plate and are subject to the clamping action of nuts 18 on the said studs to securely hold the apparatus in working position shown in Figs. 1 and 2. At its lower end the supply cup 14 has a contracted discharge spout or neck 19 that is spanned by the filtering disc 20 held in place by a cap 21. This cap 21 is perforated for the free passage of the milk and is provided with a marginal flange formed with bayonet slots 22 that are engageable with and disengageable from bayonet studs 23 on the neck 19.

Above the upper end of the vacuum cup 15, the supply cup 14 is provided with an outstanding annular flange 24 between which and the upper edge of the vacuum cup is preferably placed a pliable gasket 25 that forms an air-tight joint which renders the supply cup readily removable when free from partial vacuum or suction. At its bottom or lower end the vacuum cup 15 is provided with a discharge spout or neck 26 shown in the form of an elbow with an oblique end normally closed by a disc-like valve 27. This valve 27 may take various forms but, as shown, has a headed stud 28 that works loosely through a short arm 29 pivoted to a lug 30 on the top of the spout 26.

As a means for subjecting the vacuum cup to partial vacuum or suction, it is shown as provided with a lateral projecting nipple 31 connected by a flexible tube 32 to a source of partial vacuum or suction such as a vacuum tank 33 or the vacuum side of a vacuum pump.

In Fig. 2 the milk in the cup 14 is indicated by the character Y and the stream flowing therefrom through the filter is indicated by the character Y'.

In the use of this apparatus the milk is of course placed in the supply cup 14 and this will usually be done while the cup 15 is subject to partial vacuum. Under the action of partial vacuum the milk will be drawn through the filtering medium in a few seconds. As long as the milk is flowing through the filtering disc or medium, partial vacuum will be active in the cup 15 to accelerate flow of the milk. As long as the cup 15 is subject to partial vacuum, the valve 27 will be held closed against the pressure of the milk in the vacuum cup; but as soon as the milk has flowed through the filtering medium, say to the level of the dotted line marked $x$ on Fig. 2, air will flow quite freely through the filtering medium and reduce the partial vacuum nearly or quite to atmospheric pressure, or at any rate, to such an extent that the pressure of the milk under the action of gravity will open the valve 27 causing the milk to flow quickly into the milk can or other receptacle.

Where tests are to be rapidly made either in testing the sediment of milk or any other liquids, this apparatus will be found very highly efficient and desirable. It does not require that partial vacuum at any time be produced in the final receptacle which, in the present illustration, is the milk can. The parts of the apparatus may be quickly separated and reassembled.

The term cup as applied to the elements 14 and 15 is used in a broad and liberal sense inasmuch as these devices might have been designated as receptacles or containers or the like. The filtering medium is preferably in the form of a disc and that is the best form for use in connection with the retracted spout 19 and retaining cap 21. The valve 27 is so mounted that under normal or balanced pressures it will be held in a closed position by gravity, but will be unseated by the pressure of the milk or liquid in the vacuum cup 15 when the vacuum cup is subject to atmospheric pressure or reduced nearly to atmospheric pressure. Of course, when the vacuum cup is subject to partial vacuum the valve 27 will be closed by the increased pressure.

From the foregoing it is evident that this discharge valve may take various forms. It is also evident that the preferred form of the device which has been described is capable of a wide range of modifications within the scope of the invention herein disclosed and claimed.

What I claim is:

1. In a device of the kind described, a vacuum cup provided with a depending valve-equipped discharge passage, a supply cup provided with a discharge passage spanned by a filtering medium positioned to discharge into said vacuum cup, said discharge valve being seated under such pressure that it will remain closed when said vacuum cup is subjected to partial vacuum but will be opened by the pressure of the liquid in said vacuum cup when the pressure in the latter has been reduced to or nearly to atmospheric pressure.

2. The structure defined in claim 1 in which said supply cup is detachably seated on said vacuum cup and has a depending neck to which said filtering medium is detachably connected.

3. In a device of the kind described, a vacuum cup provided at its lower end with a laterally bent elbow-like discharge spout, and a gravity closed discharge valve, a supply cup having a contracted end telescoped into said vacuum cup and provided with a detachable displaceable cap, and a filtering disc held by said cap spanning said contracted end, said supply cup being detachable from said vacuum cup and being gravity seated thereon with a fluid tight joint.

4. The structure defined in claim 4 in which said two cups are cylindrical, said supply cup having an outstanding flange and a pliable annular gasket washer interposed between said flange and the upper end of said vacuum cup.

5. The structure defined in claim 3 in which the discharge neck of said vacuum cup is oblique in respect to a vertical line and said discharge valve has a flat face normally engaging the same, said valve being under such closing pressure that it will be opened by the pressure of liquid contained in said vacuum cup, when the latter is free from partial vacuum.

6. The structure defined in claim 1 in further combination with an anchoring base adapted for application to a milk can or the like and to which base said vacuum cup is detachably secured.

7. The structure defined in claim 3 in further combination with an anchoring base adapted for application to a milk can or the like and to which base said vacuum cup is detachably secured.

8. In a device of the kind described, a vacuum cup provided with a depending discharge opening, a gravity actuated valve normally closing said discharge passage but adapted to be opened by the weight of liquid contained in said vacuum cup when the latter is subject to substantially atmospheric pressure, a supply cup gravity seated on said vacuum cup and provided with a discharge passage spanned by a filtering medium through which liquid from said supply cup will flow into said vacuum cup, and means for rendering partial vacuum effective in said vacuum cup, to hasten the flow of the liquid from said supply cup into said vacuum cup and to hold said discharge valve closed until all of the liquid from said supply cup has passed through said filtering medium.

JOHN ARION EREKSON.